US012023689B2

(12) United States Patent
Suarez

(10) Patent No.: US 12,023,689 B2
(45) Date of Patent: Jul. 2, 2024

(54) FLUIDICS DEVICE, APPARATUS, AND METHOD FOR PARTITIONING FLUID

(71) Applicant: Domenick Arrigo Suarez, Chiefland, FL (US)

(72) Inventor: Domenick Arrigo Suarez, Chiefland, FL (US)

(73) Assignee: Quommni Technologies Limited, Hong Kong (HK)

( * ) Notice: Subject to any disclaimer, the term of this patent is extended or adjusted under 35 U.S.C. 154(b) by 523 days.

(21) Appl. No.: 17/213,884

(22) Filed: Mar. 26, 2021

(65) Prior Publication Data

US 2021/0331182 A1 Oct. 28, 2021

(30) Foreign Application Priority Data

Apr. 24, 2020 (HK) ........................... 22020006413.1

(51) Int. Cl.
*B04B 5/04* (2006.01)
*B04B 11/02* (2006.01)

(52) U.S. Cl.
CPC ............ *B04B 5/0442* (2013.01); *B04B 11/02* (2013.01)

(58) Field of Classification Search
CPC ................... B04B 5/0442; B04B 11/02; B01L 2200/0621; B01L 2300/0864; B01L 3/502723; B01L 2300/0803; B01L 2400/0409; B01L 3/50273; B01L 3/5027
See application file for complete search history.

(56) References Cited

U.S. PATENT DOCUMENTS

2008/0110500 A1* 5/2008 Kido .................. F16K 99/0028
137/829

FOREIGN PATENT DOCUMENTS

CN 110954699 A * 4/2020

OTHER PUBLICATIONS

CN 110954699 English Machine Translation.*

* cited by examiner

*Primary Examiner* — Walter D. Griffin
*Assistant Examiner* — Shuyi S. Liu

(57) ABSTRACT

Embodiments of the invention relate to centrifugal fluidic devices, apparatus, and methods. Embodiments disclosed are fluidic devices, and associated apparatus and methods, which can partition a fluid sample from a single inlet or plurality of inlets into a plurality of chambers via their fluid inlets. Each chamber possesses a fluid outlet and a gas outlet. Partitioned fluid can be further distributed under centrifugal pressure to downstream fluidics modules, permitting various multiplexed assays to be performed including nucleic acid amplification tests.

11 Claims, 10 Drawing Sheets

FLUIDICS DEVICE, APPARATUS, AND METHOD FOR PARTITIONING FLUID

CROSS-REFERENCE TO RELATED APPLICATIONS

This application claims priority to Hong Kong Patent Application No. 22020006413.1, filed on Apr. 24, 2020, which is incorporated by reference herein in its entirety.

TECHNICAL FIELD

Embodiments of the invention relate to centrifugal fluidic devices, apparatus, and methods.

BACKGROUND OF THE INVENTION

In various scientific disciplines, especially in the biological and chemical sciences, and in industry and medicine, it is necessary to conduct various assays and experiments in a fluid format. In the biological sciences, for example, these assays can include enzymatic, immunological, metabolic, and/or diagnostic assays. Diagnostic assays in particular are of particular import in medicine, with nucleic acid amplification tests (NAATs) being especially useful. Relying upon polymerase chain reaction (PCR) technology, which is performed in an aqueous format, NAATs are capable of diagnosing not only infectious diseases but also genetic disorders and genetic predispositions towards disease. In this way, fluid-based assays have relevance not only in basic research but also in industrial and clinical applications. To this end, fluid-based assays must often be performed in a multiplexed format, such that samples which can be fluids (or suspensions within a fluid) must be analyzed in parallel or be subjected to multiple different analyses in parallel. For example, in medical diagnostics, it is often necessary to take a tissue sample (i.e. blood, saliva) from a patient and perform a series of simultaneous tests on said sample. A NAAT can be performed on said sample, and when multiplexed it can test a patient's sample for a multitude of infectious diseases by amplifying specific pathogenic nucleic acid materials present within the sample. Originally, this would have required manual partitioning of the sample by a skilled technician into separate aliquots which can each be subjected to a different nucleic acid analysis for a different pathogen. Multiplexing these tests allows for a larger number of pathogens to be screened at once but also increases the complexity of the assay, requiring more time and effort to complete since more aliquots must be individually assayed. Similarly, various other assays require more time and effort once they are multiplexed, regardless of the context in which they are performed. The problem therefore is trying to obtain multiplexed assay results, which are more informative and useful, while minimizing the workload.

There are various approaches to reducing the workload required to complete a multiplexed assay. One such approach involves the use of microfluidics, which realizes multiplexing capabilities by permitting more facile handling of small quantities of fluid. In this way, a fluid sample along with reagents can be subdivided into smaller aliquots, which permits more experiments to be conducted on a single sample. Centrifugal microfluidics in particular enable facile aliquoting of fluids. These devices have microfluidic inlets, outlets, chambers, channels, and other components arranged in such a way that the centrifugal force acting on liquids within the sample supplies the required pressure to motivate these liquids through the microfluidics. In many cases, all that is required to actuate the microfluidic device is a motive force to revolve the centrifugal microfluidic device around its rotational axis at a set of pre-defined rotational frequencies. These centrifugal microfluidic devices are typically disk-shaped and usually possess some degree of rotational symmetry. Numerous instances of these centrifugal microfluidic devices are known in the prior art.

- U.S. Pat. No. 6,527,432, issued to Kellogg et al. on Mar. 4, 2003, discloses bidirectional flow centrifugal microfluidic devices.
- U.S. Pat. No. 6,632,399, issued to Kellogg et al. on Oct. 14, 2003, discloses devices and methods for using centripetal acceleration to drive fluid movement in a microfluidics system for performing biological fluid assays.
- U.S. Pat. No. 6,719,682, issued to Kellogg et al. on Apr. 13, 2004, discloses an electronic spindle for using centripetal acceleration to drive fluid movement in a microfluidics system.
- U.S. Pat. No. 7,332,126, issued to Tooke et al. on Feb. 19, 2008, discloses and integrated microfluidic disc.
- U.S. Pat. No. 7,596,073, issued to Ferren et al. on Sep. 29, 2009, discloses a method and system for fluid mediated disk activation and deactivation.
- U.S. Pat. No. 8,222,045, issued to Lee et al. on Jul. 17, 2012, discloses a microfluidic device using centrifugal force, method of manufacturing the microfluidic device and sample analyzing method using the microfluidic device.
- U.S. Pat. No. 8,444,934, issued to Peytavi on May 21, 2013, discloses a removable microfluidic cell.
- U.S. Pat. No. 8,916,112, issued to Fonseca on Dec. 23, 2014, discloses liquid distribution and metering.
- U.S. Pat. No. 9,562,262, issued to Peytavi et al. on Feb. 7, 2017, discloses a fluidic centripetal device.
- U.S. Pat. No. 10,001,125, issued to Paust et al. on Jun. 19, 2018, discloses a fluidics module, device and method for pumping a liquid.
- U.S. Pat. No. 10,166,541, issued to Kulinsky et al. on Jan. 1, 2019, discloses a centrifugal microfluidic platform for automated media exchange.

A drawback in the aforementioned prior art methods and apparatus is mechanical engagement of the microfluidic device at the center. That is, the devices tend to be rotated by applying a torque at their centers, via a large central hole for example, as found in CDs or DVDs. Furthermore, in many of the devices found in the prior art, including the aforementioned, microfluidic modules are typically used which occupy a portion of the device and can be duplicated around the axis of revolution on the device, which simplifies the design. However, given that most centrifugal devices are rotated by applying torque at their centers, it is difficult to distribute fluid from one location on the disk to each of the identical microfluidic modules situated around the axis of rotation. This difficulty arises from the asymmetry of having a single inlet which is not located at the rotational center of the device, meaning not all modules have equivalent access to the inlet, and must therefore either be redesigned, which might cost space on the device, or be subject to fluid transport which is inconsistent between the modules. Therefore, in cases where a single sample must be distributed to multiple chambers situated around a disk via a single inlet, it would be ideal to position said inlet at the rotational center, in order to preserve symmetry and functionality, and maximize usage of space on the microfluidic device.

There are a few centrifugal microfluidic devices illustrated in the prior art which attempt to distribute fluid via a single inlet to multiple fluidics modules situated azimuthally around the device's rotational axis.

Ding, Zhaoxiong, et al. "An in-line spectrophotometer on a centrifugal microfluidic platform for real-time protein determination and calibration." Lab on a Chip 16.18 (2016): 3604-3614 discloses an apparatus and method for distributing a sample from a single, centrally-located chamber on a centrifugal microfluidic disk to a plurality of assay chambers around the periphery of the device. In their apparatus, the central chamber possessed a single opening into a spiral shaped channel which wraps once around the disk and terminates in a waste collection chamber. The central chamber is slightly offset from the center such that fluid is forced into the channel by centrifugal force once the disk is rotated. This disk possesses the simplicity of loading a sample through a single inlet, however, by utilizing only a single outlet from the central chamber it does use space on the disk as efficiently as possible. It would be ideal, for example, to have a plurality of channels emanating from the central reservoir so as to maximize usage of space. However, the design of the central chamber does not permit this.

In U.S. Pat. No. 8,945,480, a device which uses a "flow splitting" technique is described which allows for the partitioning of fluid in a central chamber to a plurality of chambers along the periphery of the disk. This device requires a centrifugal force to subdivide a sample into sub-chambers within the central chamber, followed by an increase rotational frequency to force the subdivided liquid through valves into the individual chambers along the disk's periphery. Such a device suffers from two critical drawbacks. First, although liquid within the central chamber should in theory be subdivided between the sub-chambers contained within the central chamber, this may be only partially done. That is, depending on the volumes used, there may be a liquid film which establishes fluid continuity between the sub-chambers. In this way, all valves must burst precisely simultaneously when rotational frequency is increased, so that liquid in each sub-chamber is distributed to its corresponding sector of the microfluidic disk. If even one valve bursts prematurely with respect to the others, for example, surface tension over the continuity of liquid between the sub-chambers can draw all liquid preferentially into the sector of the disk for which the valve burst prematurely. This is especially problematic at small liquid volumes, where surface tension plays a physically more significant role. In this way, such a design would require an extreme level of precision and the methodology would require precise execution such that the design is not readily practically viable.

Secondly, even if liquid can be subdivided properly within the central chamber, it would require a substantially centrifugal force to work properly. This corresponds to an elevated rotational frequency, which can be substantially higher than those found in other centrifugal microfluidic devices and designs. This further means that the "flow splitting" design required for partitioning liquid from the central chamber may be incompatible with other useful microfluidic modules, which may use fluidic burst valves for example. This limits the applicability of such a partitioning apparatus.

U.S. Pat. No. 9,186,671 discloses devices similar to the ones in U.S. Pat. No. 8,945,480 and in Ding et al. One embodiment described is similar to the invention described in U.S. Pat. No. 8,945,480 in that it uses centrifugal forces derived from rotating a microfluidic disk to force liquid into sub-chambers of the central chamber into which the fluid sample is loaded. For the same reasons stated for the device in U.S. Pat. No. 8,945,480, this design possesses an inherent set of disadvantages. Namely, surface tension can impede proper partitioning of the fluid and the higher rotational frequencies required for proper portioning might be incompatible with a variety of potential downstream microfluidics modules. Another embodiment is similar to the device described in Ding et al., in that a central chamber which is displaced from the rotational center feeds into a channel which spirals around the central chamber, and connects to chambers that line the radially distal side of the channel. As mentioned before for the device disclosed in Ding et al., this design would hamper efficient usage of the limited centrifugal microfluidic device space.

Most centrifugal fluidic devices currently known to the state of the art do not maximize usage of available space due to the presence of central holes which mechanically engage with rotors and transmit torque to the devices. This not only makes usage of space inefficient but also makes it difficult to distribute a single sample around the rotational axis of the device without having to load it multiple times. As for those devices which do permit distribution of fluid around the chip from a single inlet, there are critical drawbacks which hinder their utility. These drawbacks include an inability to fully maximize space usage, difficulties in properly distributing fluids due to surface tension effects, and potential incompatibilities with microfluidic modules which are downstream of the initial partitioning fluidics.

SUMMARY

In an embodiment of the invention, a fluidic device which is rotatable about a rotational center comprises one or a plurality of first fluid inlets; one or a plurality of first chambers located farther from the rotational center than any first fluid inlets, with each first chamber having a fluid outlet, a gas outlet, and a fluid inlet; and one or a plurality of first channels, wherein each first channel fluidly connects a central chamber's fluid inlet to a first fluid inlet or first fluid inlets, wherein each first chamber has a fluid outlet which is located farther from the rotational center than either the first chamber's fluid inlet or the first chamber's gas outlet, wherein the first chamber's fluid outlet has a higher resistance to fluid flow than the first chamber's gas outlet, wherein the first chamber's gas outlet has a higher resistance to fluid flow than the first chamber's fluid inlet, and wherein, with input of fluid into the first fluid inlets, fluid is motivated through the first channel or channels into each first chamber via its fluid inlet, filling each first chamber while not moving past the first chamber's fluid outlet or gas outlet.

In an embodiment of the invention, in the fluidic device, for each first chamber the cross-sectional area of the first chamber's fluid inlet is greater than the cross-sectional area of the first chamber's gas outlet, which in turn is greater than the cross-sectional area of the first chamber's fluid outlet.

In an embodiment of the invention, in the fluidic device, the first chamber's fluid outlet is closer to the first chamber's fluid inlet than the first chamber's gas outlet is to the first chamber's fluid inlet.

In an embodiment of the invention, in the fluidic device, the first chamber's wall between the first chamber's fluid outlet and the first chamber's gas outlet monotonically decreases in distance from the rotational center as it transitions from the first chamber's fluid outlet to the first chamber's gas outlet.

In an embodiment of the invention, in the fluidic device, the first chamber's fluid outlet connects to a second channel, wherein the second channel is a fluidic valve which is fluidly connected to a third channel, wherein the third channel follows a route which moves further from the rotational center as it progresses azimuthally with respect to the rotational center, is lined on its radially distal side with respect to the rotational center by a plurality of second chambers to which it is fluidly connected, and terminates in a third chamber, wherein the second chambers are terminated at their radially distal portions with respect to the rotational center by a fourth channel, wherein said fourth channel is a fluidic valve which connects each second chamber to a separate fourth chamber, which is located further from the rotational center than the second chamber, and wherein each fourth chamber has a gas outlet which is located on its radially proximal side with respect to the rotational center.

In an embodiment of the invention, in the fluidic device, at least one indentation is present along the edge of the device.

In an embodiment of the invention, an apparatus for partitioning fluid comprises the fluidic device and a means of rotating the fluidic device.

In an embodiment of the invention, in the apparatus, the means of rotating the fluidic device is a motor.

In an embodiment of the invention, in the apparatus, the motor is attached to a rotor and is controlled by a means for modulating rotational frequency.

In an embodiment of the invention, in the apparatus, the rotor has at least one protuberance which can mechanically engage with at least one indentation present along the edge of the fluidic device.

In an embodiment of the invention, a method for partitioning fluid comprises introducing a fluid into a fluidic device through one or more first fluid inlets; applying pressure to motivate fluid from the first fluid inlet or inlets into one or more first channels; continuing to apply pressure to motivate fluid from a first channel into a first chamber via its fluid inlet, until fluid has reached both the first chamber's fluid outlet and gas outlet; continuing to apply pressure such that fluid is motivated through the first fluid inlet or inlets into another first channel and into the first chamber with which it is fluidly connected; continuing to apply pressure until each first chamber has liquid reaching its fluid outlet and gas outlet; and rotating the fluidic device at a first frequency which can generate a sufficient centrifugal force such that the fluid in each first chamber is motivated radially outwards through the first chamber's fluid outlet and away from the first chamber's fluid inlet and gas outlet.

In an embodiment of the invention, the method for partitioning fluid further comprises rotating the fluidic device at the first frequency to generate a sufficient centrifugal force such that the fluid in each first chamber is motivated through the first chamber's fluid outlet, through a second channel which functions as a fluidic valve, into a third channel, and into a plurality of second chambers such that each second chamber is filled up to a fourth channel which terminates its radially distal portion with respect to the rotational center, with excess fluid beyond what can fill the second chambers proceeding further along the second channel until reaching a third chamber; and rotating the fluidic device at a second frequency which is higher than the first frequency and generates a sufficient centrifugal force such that the fluid in each second chamber is motivated through the fourth channel which functions as a fluidic valve into a separate fourth chamber, with fluid displacing any gas present in the fourth chamber via its gas outlet.

It is an advantage of embodiments of the invention that a single sample from a single inlet or set of inlets can be partitioned into a plurality of chambers situated at any azimuthal angle relative to the rotational access of a centrifugal microfluidic device. It is also an advantage that said partitioning of a single sample from a sample chamber is robust to the effects of surface tension, due to the geometry of the fluidics. It is also an advantage that this robustness to surface tension permits more flexibility in the designs of downstream microfluidics modules, since the pressure used to initially partition the sample is not dependent on centrifugal forces. It is also an advantage that imprecise volumes of fluid can be inserted into embodiments of the device, and precisely handled and distributed within the device with the application of varying levels of centrifugal force.

Said downstream microfluidics modules can permit further partitioning and distribution of the sample, allowing for facile setup of multiplexed chemical, biological, or medical assays, or other assays which can be performed in a fluidic format. This ease of use is advantageous to end users, including laypersons and consumers who typically lack the required skill to perform medical diagnostics, and can facilitate point-of-care diagnostics.

Definitions

In this specification, the term "centrifugal fluidic device" is intended to mean a fluidic network in which fluid is motivated by the action of rotating the fluidic network.

In this specification, the term "sample" is intended to mean any fluid, solution, mixture, or suspension to be processed within the centrifugal microfluidic device.

In this specification, the term "channel" is intended to mean a path in a centrifugal fluidic device which permits fluid flow between centrifugal fluidic device chambers, channels, or other components.

In this specification, the term "inlet" is intended to mean an opening to a centrifugal fluidic device chamber or channel which allows fluid to enter said chamber or channel.

In this specification, the term "outlet" is intended to mean an opening to a centrifugal fluidic device chamber or channel which allows fluid or gas to exit said chamber or channel.

In this specification, the terms "burst valve", "fluidic valve", or "valve" are used interchangeably and are intended to mean a structure of a centrifugal fluidic device which has the primary function of preventing fluid flow below a threshold pressure applied on the fluid, with pressure on the fluid typically being generated by the rotation of the centrifugal fluidic device.

In this specification, the term "fluidly connected" is intended to mean the state of two or more centrifugal fluidic device components, including but not limited to chambers or channels, being operably interconnected so as to permit fluid flow between the components.

BRIEF DESCRIPTIONS OF THE DRAWINGS

Figure 4A:
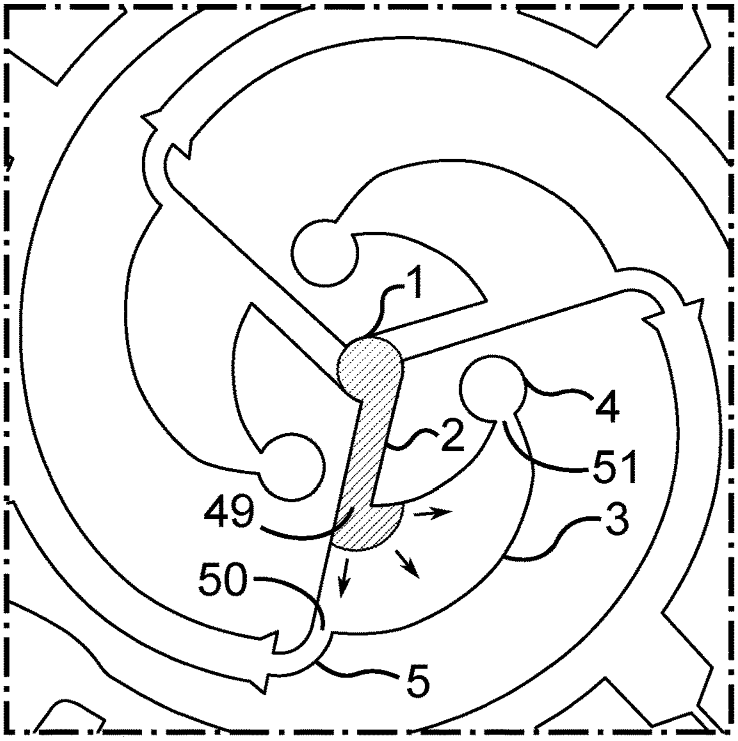
Figure 4B:
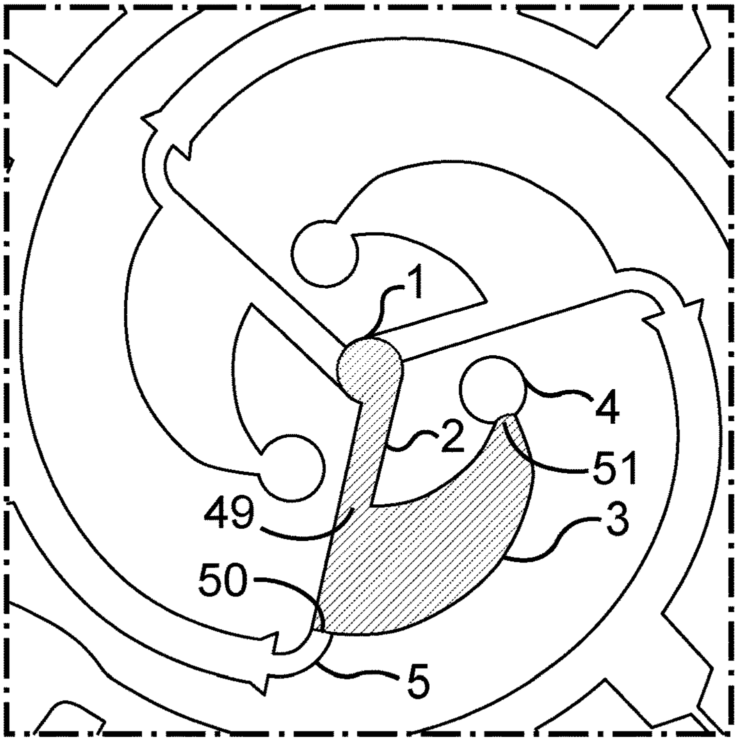
Figure 4C:
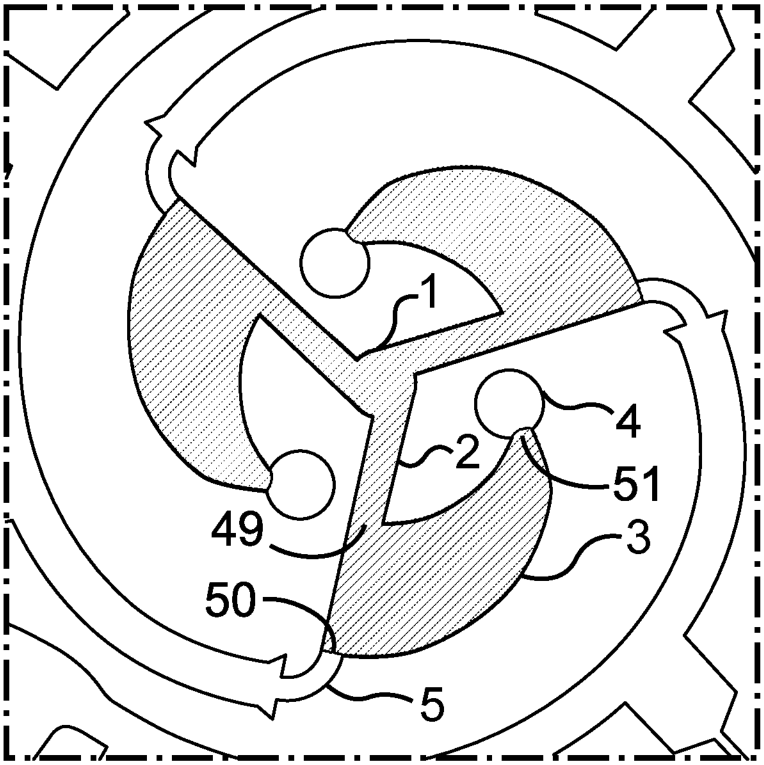

FIG. 4A, FIG. 4B, and FIG. 4C depict the filling of the central chambers of said centrifugal fluidic device.

Figure 5A:
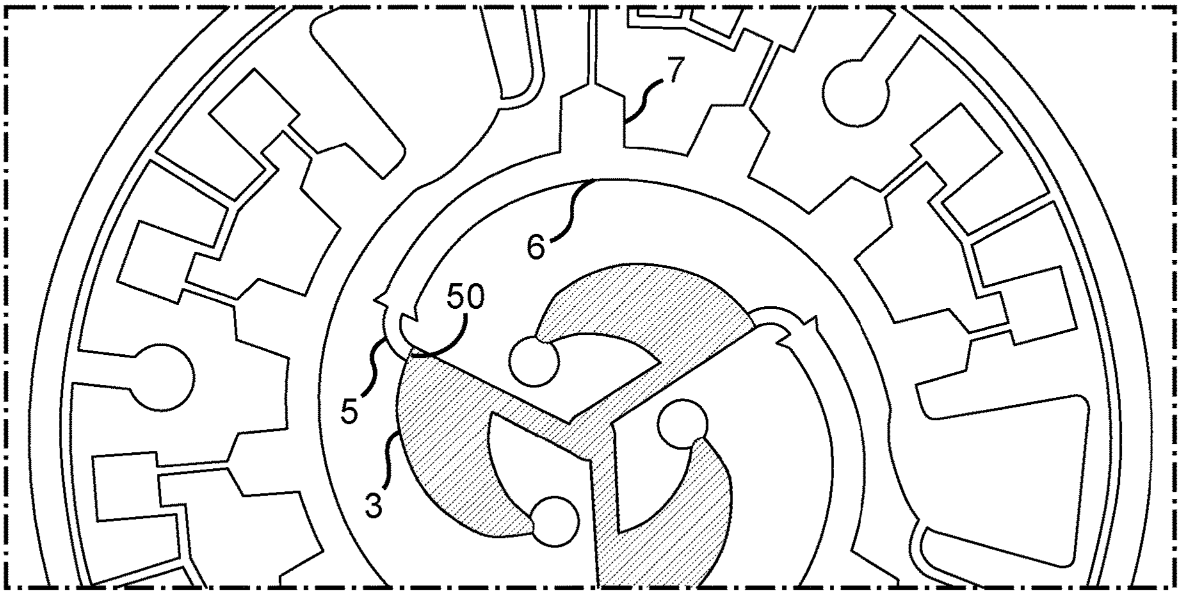
Figure 5B:
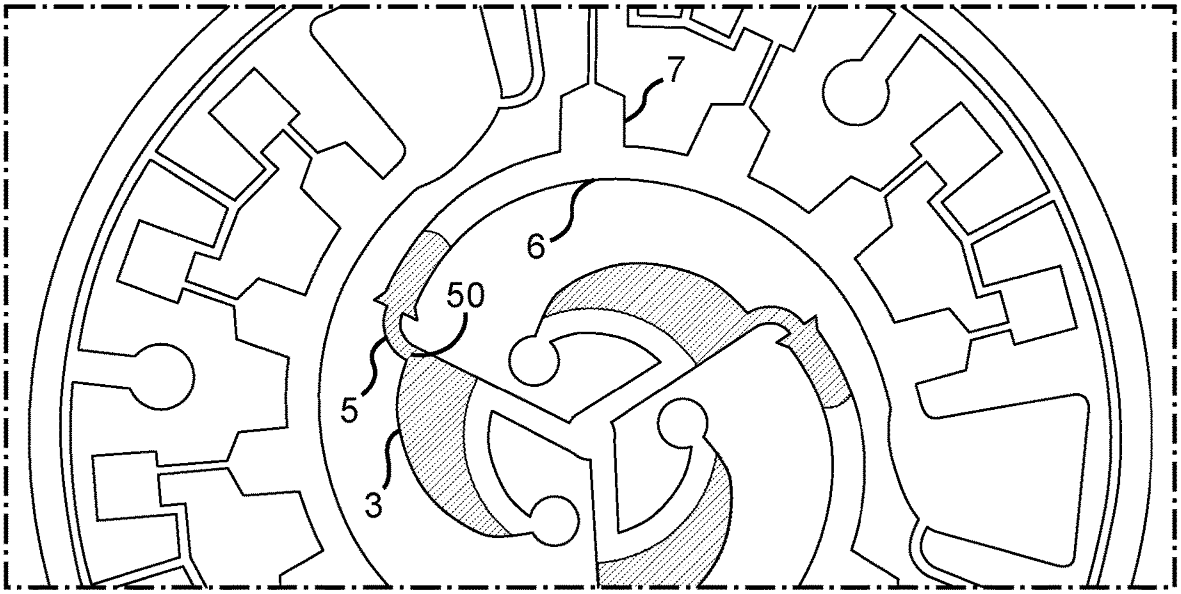
Figure 5C:
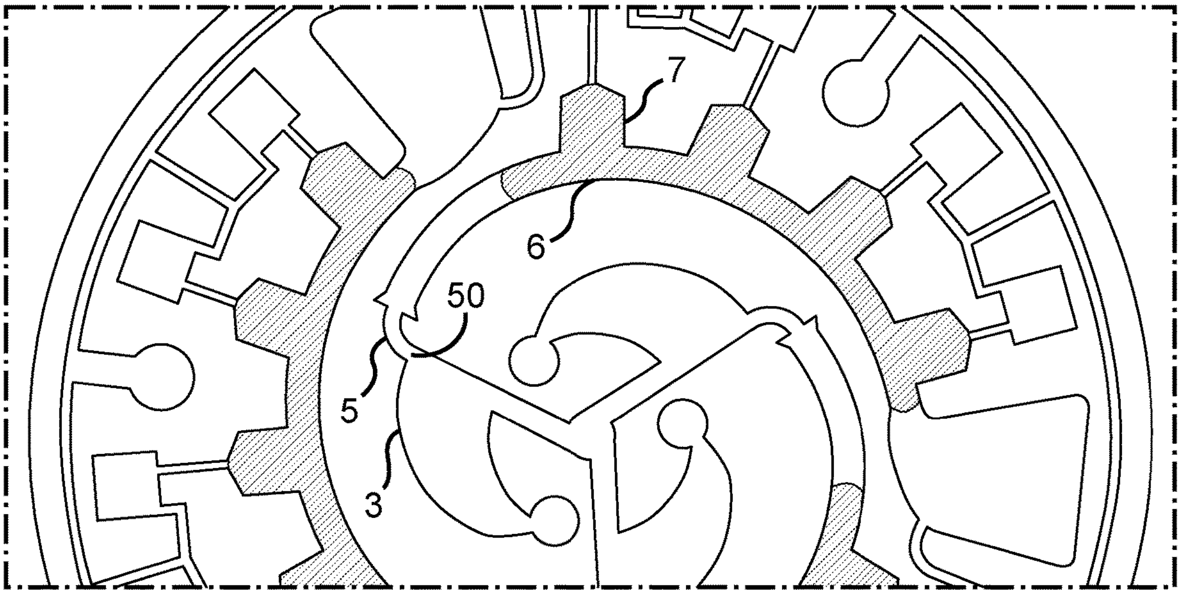

FIG. 5A, FIG. 5B, and FIG. 5C depict distribution of fluid from the central chambers within said centrifugal microfluidic device to downstream fluidics modules.

Figure 6A:
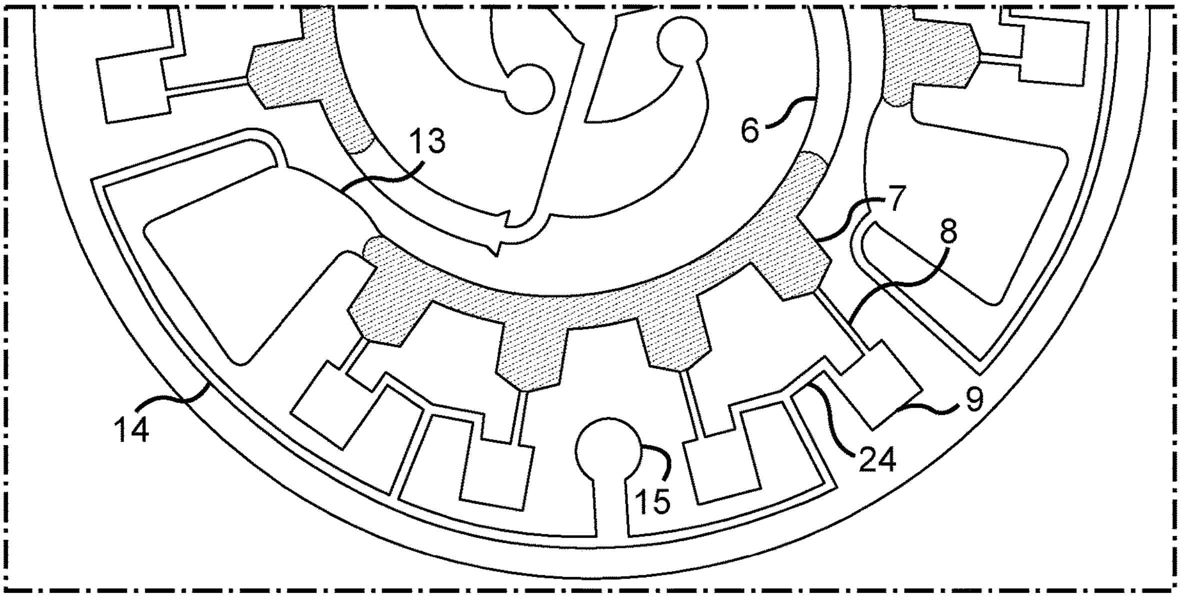
Figure 6B:
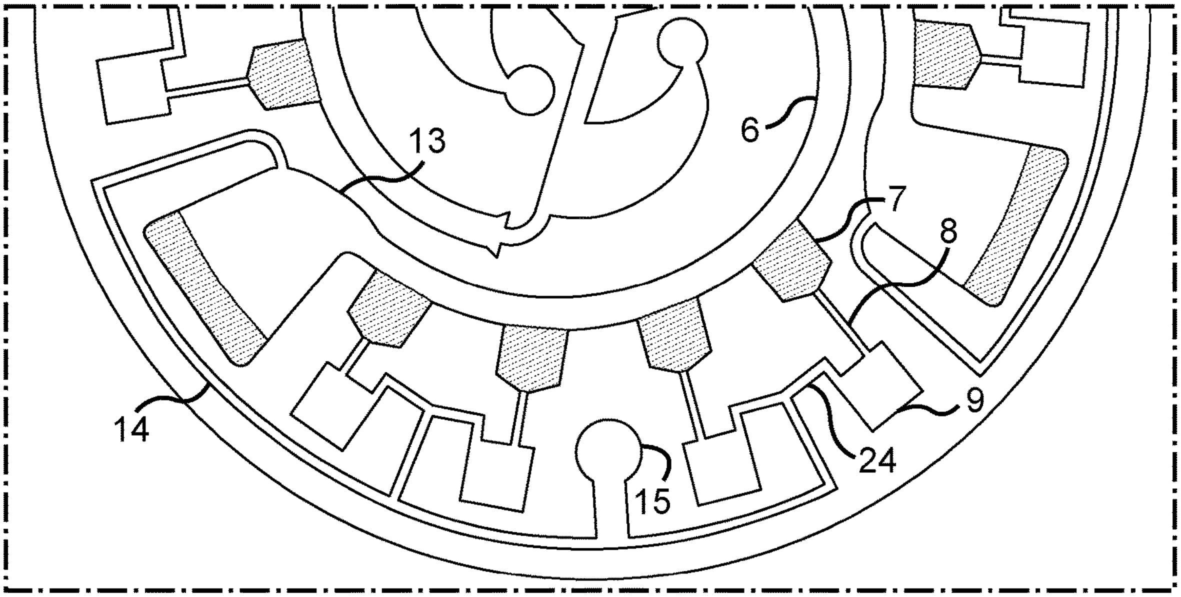
Figure 6C:
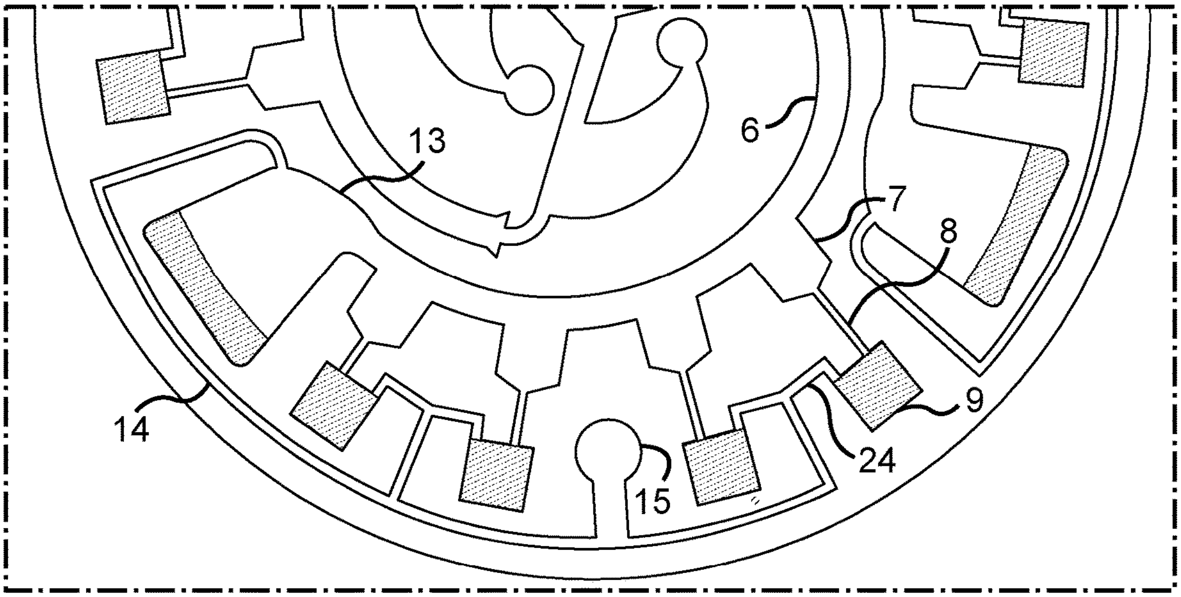

FIG. 6A, FIG. 6B, and FIG. 6C depict partitioning of fluid into reaction chambers within said centrifugal microfluidic device.

Figure 7:
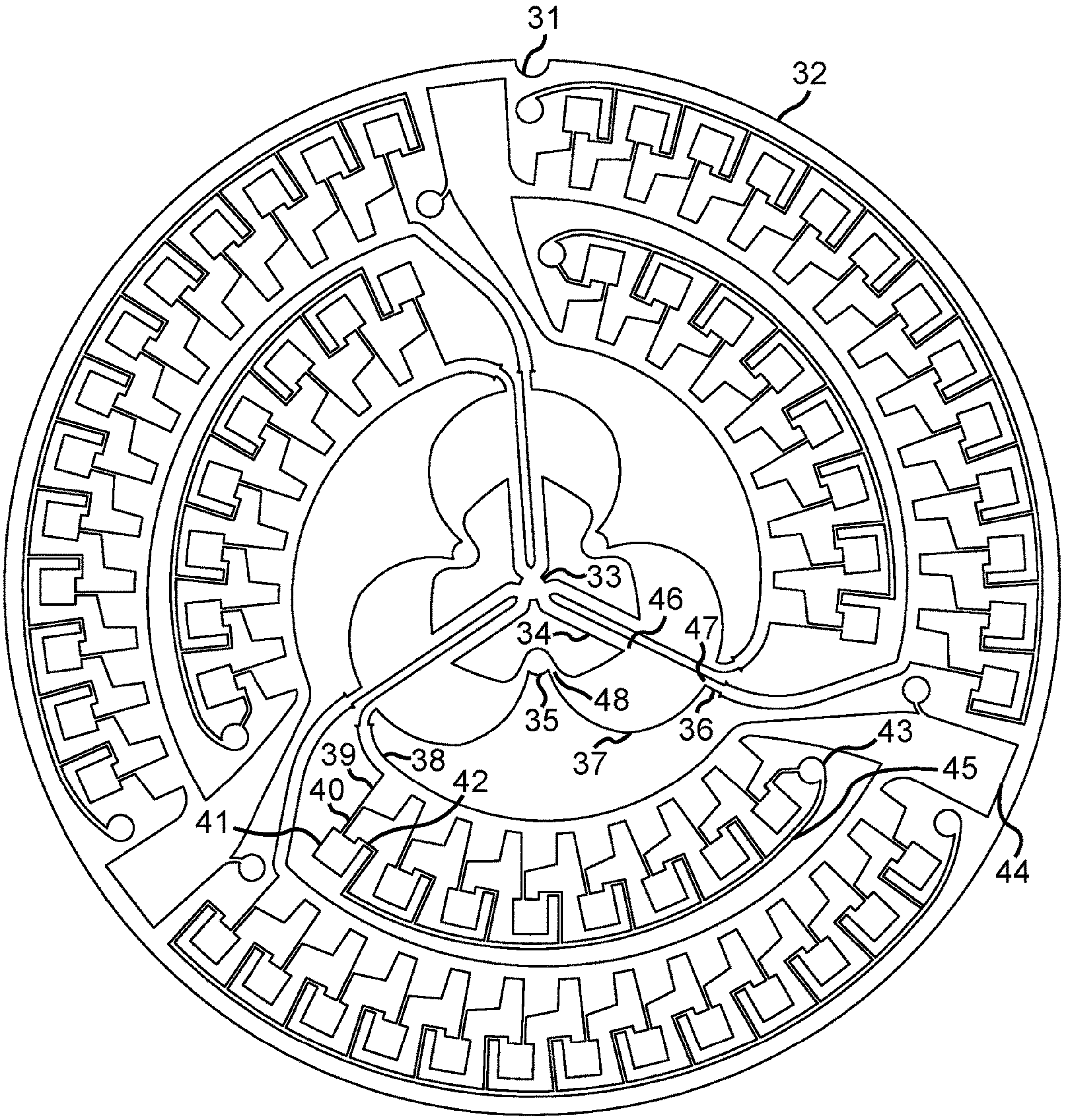

FIG. 7 is a layout view of an alternative embodiment of the centrifugal fluidic device.

DETAILED DESCRIPTION OF EXEMPLARY EMBODIMENTS

Embodiments of the invention are intended to partition fluids. To this end, there is a plurality of suitable methods and materials which can be used to produce embodiments of the invention. These materials and methods, along with any surface coatings or device treatments implemented, can be selected to suit a variety of applications, including but not limited to chemical and biological experiments or assays, and medical diagnostics.

Embodiments of the invention can be manufactured as two separate halves of a single centrifugal fluidic device bisected by a plane which is coplanar with the plane of rotation of the device. These halves can be joined together, which allows for the loading of reagents or assay materials into the centrifugal fluidic device prior to assembly of the centrifugal fluidic device. These halves do not need to be made from the same material, and can be made from a variety of materials as are suitable to the intended applications of the centrifugal fluidic devices. Selection of these materials is therefore dependent upon manufacturing techniques, structural specifications, and reagent compatibility, amongst other parameters. Materials which can be used in exemplary embodiments include but are not limited to: polystyrene, polypropylene, polycarbonate, polyethylene, and Acrylonitrile Butadiene Styrene (ABS), glass, polydimethylsiloxane (PDMS), silicon, silica, and quartz. Depending upon choice of materials, centrifugal fluidic device halves can be produced, for example, using injection molding with suitable materials, including but not limited to polystyrene, polypropylene, polycarbonate, polyethylene, and Acrylonitrile Butadiene Styrene (ABS). These halves can also be produced using embossing techniques, such as heat embossing, to transfer fluidic patterns and components from a positive metal mold into thermoplastic materials. Halves can also be produced using soft lithography: PDMS is a suitable material which can be cast and set into positive molds of the desired fluidic system. Molds for this purpose can be produced using photoresists on silicon wafers as is conventionally done or using 3D printing or milling techniques to realize designs and patterns which have three-dimensional features. Halves can be joined together using epoxies or glues, ultrasonic welding, plasma or corona treatment, or any other suitable method depending upon the materials and application. Prior to being joined, reagents can be loaded into the appropriate chambers within either or both halves in dry or liquid format. If in liquid format, reagents can be further desiccated, vacuum dried, or lyophilized, amongst other processing techniques, in order to promote stability and consistency of the final assembled centrifugal microfluidic device. It shall also be noted that embodiments of the present invention are especially applicable to the field of centrifugal microfluidics, which entails processing of liquid volumes on the order of nanoliters to milliliters, and accordingly, the fluidics structures may have suitable dimensions for handling corresponding volumes of liquid. The following detailed description will serve to illustrate exemplary embodiments of the invention.

Figure 1:
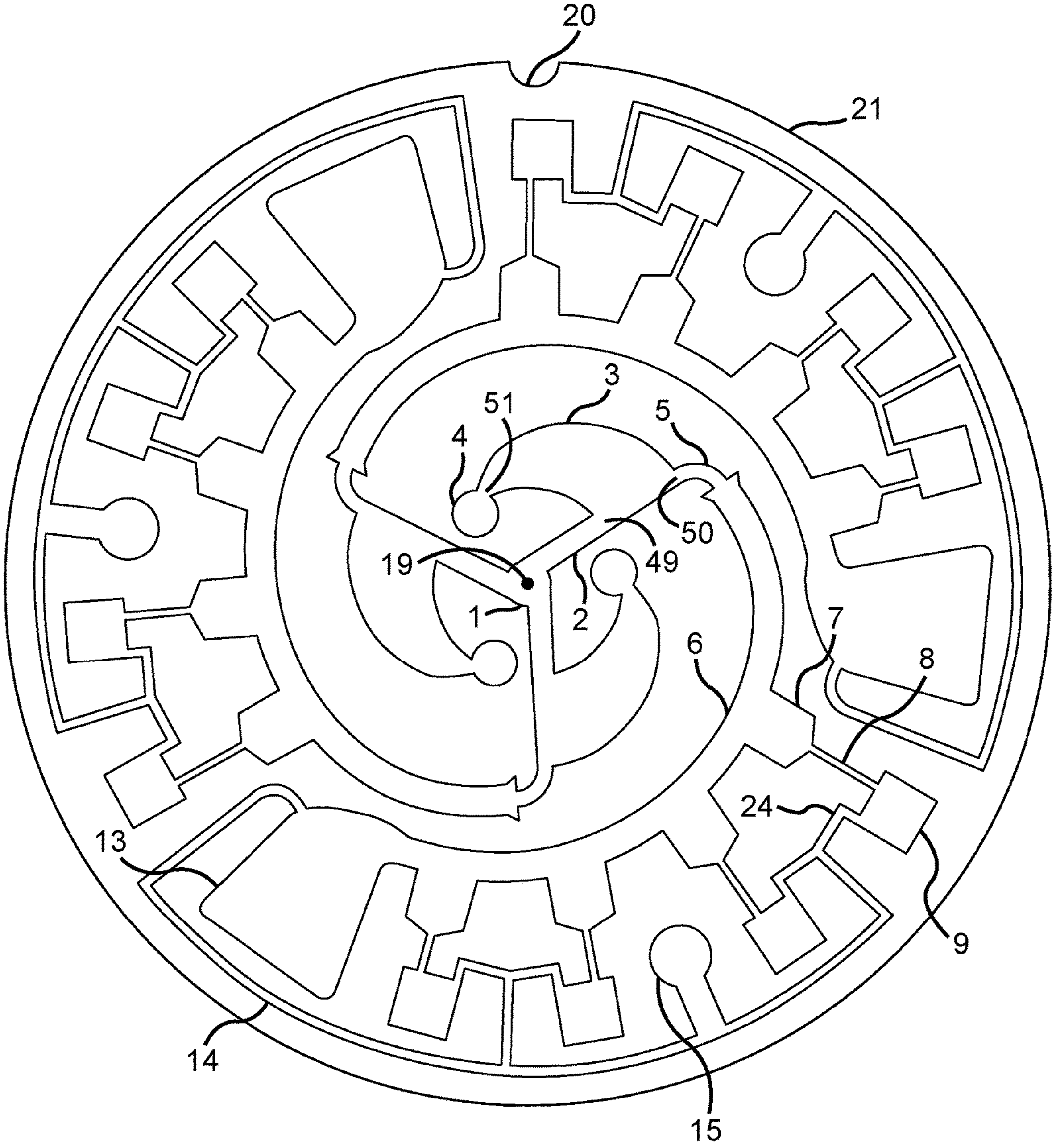
FIG. 1 is a layout view of a centrifugal fluidic device.

FIG. 1 is a layout view of an embodiment of the invention in the form of a cylindrical centrifugal fluidic device 21. The centrifugal fluidic device 21 has an indentation 20 along its periphery to facilitate mechanical engagement when the centrifugal fluidic device 21 is rotated. The centrifugal fluidic device 21 possesses a sample inlet 1 which is centered on the rotational center 19 of the centrifugal fluidic device 21. This sample inlet 1 is fluidly connected to central chambers 3 through a series of radially oriented channels 2 which connect to fluid inlets 49 of the central chambers 3. The central chambers 3 each possess a fluid outlet 50 and a gas outlet 51. In embodiments of the invention, such as the one depicted in FIG. 1, the fluid outlet 50 can be positioned closer to the fluid inlet 49 than the gas outlet 51 is positioned to the fluid inlet 49. This is so that when fluid is loaded into a central chamber 3 it first reaches the fluid outlet 50 and then displaces any gas remaining in the chamber 3 towards the gas outlet 51 and through a gas conduit 4 which allows displaced gas to exit the centrifugal fluidic device 21. The fluid outlet 50 is connected to a burst valve 5 which connects to a channel 6 which follows an azimuthal route around the rotational axis that progressively increases its radial distance from the rotational center. The channel 6 is lined on its radially distal side with respect to the rotational center 19 with metering chambers 7 and terminates in an excess fluid chamber 13. Each metering chamber 7 feeds into a channel 8 which functions as a burst valve and is positioned on the radially distal side of the metering chamber 7 with respect to the rotational center 19. This valve 8 feeds into a reaction chamber 9. Each reaction chamber 9 possesses a gas outlet 24 on its radially proximal side with respect to the rotational center 19 which connects to a gas conduit 14 which in turn connects to a gas outlet 15 through which gases may exit the centrifugal fluidic device 21.

Figure 2:
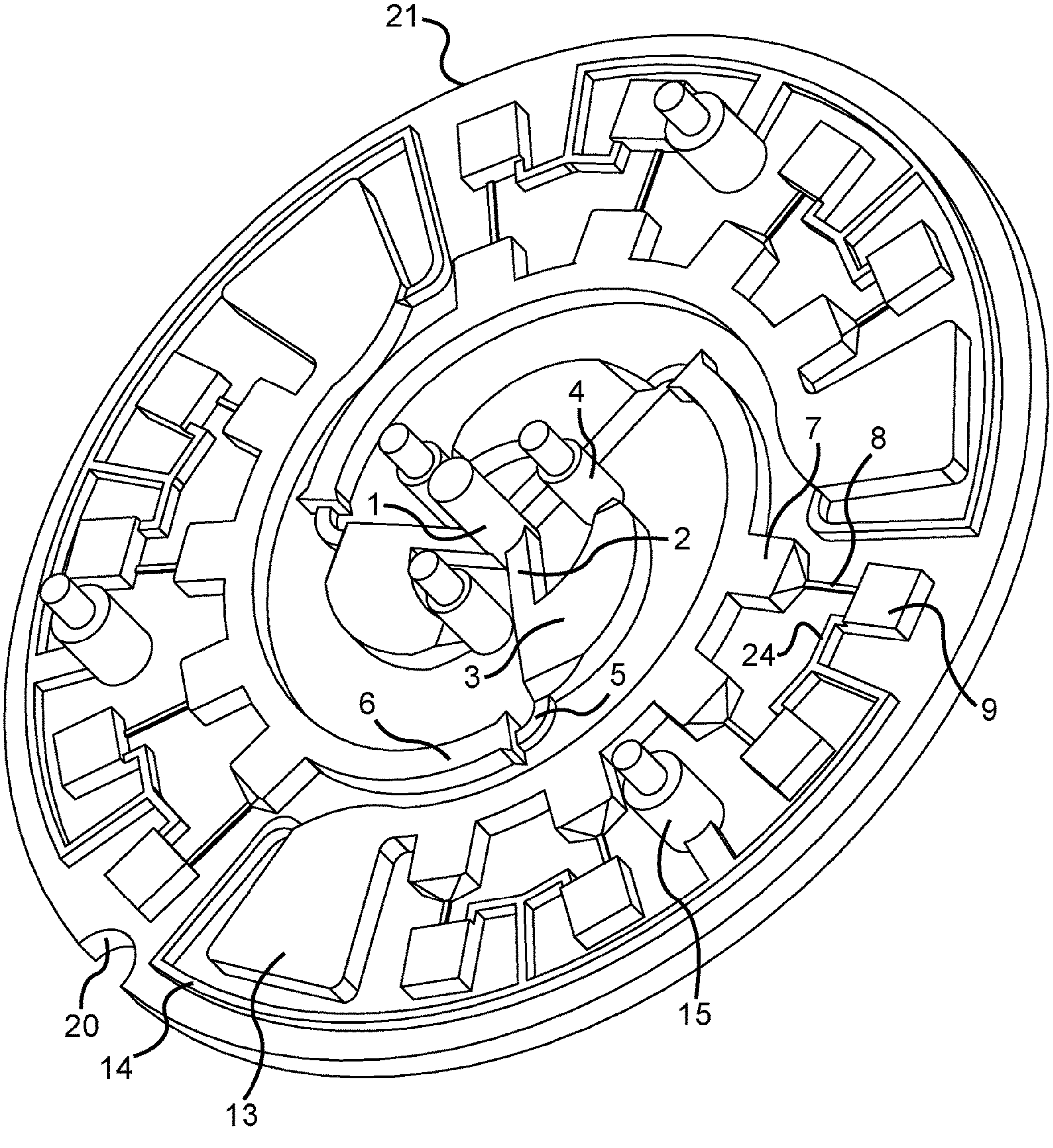
FIG. 2 is a perspective view of said centrifugal fluidic device.

FIG. 2 is a perspective view of an embodiment of the invention in the form of a cylindrical centrifugal fluidic device 21. This view of the centrifugal fluidic device 21 emphasizes structural aspects which cannot be appreciated in the layout view in FIG. 1. In an embodiment of the invention, the cross-sectional area of the channel 2 leading to the fluid inlet 49 of the central chamber 3 and the cross-sectional area of the fluid inlet 49 itself are larger than the cross-sectional area of the gas outlet 51 of the central chamber 3, which in turn is larger than the cross-sectional area of the fluid outlet 50. This ensures that fluid entering the central chambers 3 encounters greater resistance at the fluid outlet 50 and the gas outlet 51 than at the fluid inlet 49. This in turn ensures that once a central chamber 3 is filled with fluid, additional fluid which is supplied to the first fluid inlet 1 is motivated to move into another empty central chamber 3, as opposed to flowing through the fluid outlet 50 or gas outlet 51, thereby filling the central chambers 3 in succession until all are filled. The cross-sectional area of the first burst valve 5 is greater than the cross-sectional area of the burst valves 8 which lead into the reaction chambers 9. With the first burst valve 5 having a larger cross-sectional area, it permits fluid flow at a lower rotational frequency ($\omega_{low}$) while the reaction chamber burst valves 8 do not permit fluid flow at this same frequency. This ensures that liquid is metered by the metering chambers 7 at this frequency while excess fluid proceeds to the excess fluid chamber 13, instead of the fluid immediately flowing into the reaction chambers 9 and hampering proper partitioning.

Figure 3:
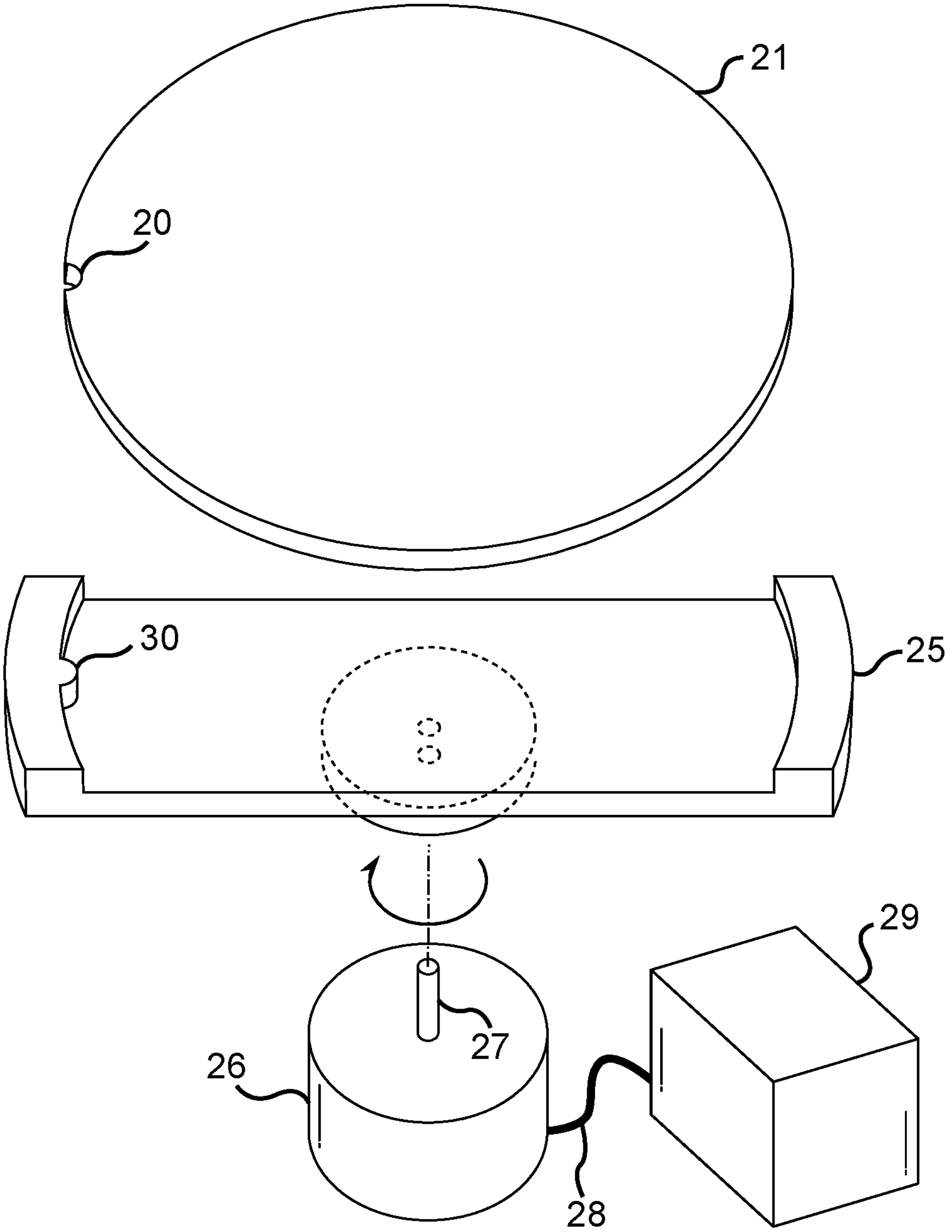
FIG. 3 is a perspective view of said centrifugal fluidic device along with the apparatus for actuating the fluidic device.

FIG. 3 illustrates an exemplary embodiment of an apparatus used for centrifugal pumping of the centrifugal fluidic device 21. The fluidic device 21, which features an indentation 20 for mechanical engagement, is loaded onto a rotor 25. This rotor 25 features a protuberance 30 which mechanically engages with the indentation 20. The rotor 25 is joined to the drive shaft 27 of a motor 26. The rotor 25 can be fastened to the drive shaft 27 using an interference fit, set screw, adhesive, or any other suitable means. The motor 26 is controlled by a controller module 29 via an electrical connection 28. The controller module 29 can be pre-programmed to drive the motor 26 at a set of pre-determined speeds. These speeds are determined such that the drive shaft 27, rotor 25, and fluidic device 21 all rotate at a suitable frequency to properly motivate fluids within the fluidic device 21. These frequencies can be empirically determined and will vary depending on the dimensions of the centrifugal fluidic device 21, the materials and methods used to fabricate it, and the composition of the sample to be processed by the centrifugal fluidic device 21, among other variables and parameters. The controller module 29 can be a computer, microcontroller, or any other suitable apparatus capable of setting the speed of the motor 26.

FIG. 4A, FIG. 4B, and FIG. 4C illustrate filling of the central chambers 3 of the centrifugal fluidic device 21. FIG. 4A shows the filling of the first of three central chambers 3. Note that due to the chambers 3 being identical, their sequence of filling is random. A sample is loaded via the sample inlet 1 and progresses through a first channel 2 and through the central chamber's fluid inlet 49 into the central chamber 3 with pressure being applied to the sample inlet 1. This pressure can be supplied via syringe, pipette, or any other suitable means and can be manual or automated. Arrows indicate the general movement of the sample fluid as it enters the central chamber 3. It continues to do this, and in embodiments where the fluid outlet 50 is closer to the fluid inlet 49 than the gas outlet 51 is to the fluid inlet 49, the fluid will first reach the fluid outlet 50 and continue to displace any remaining gas in the central chamber 3 through the gas outlet 51 and into the gas conduit 4 which leads out of the centrifugal fluidic device 21. The fluid cannot proceed past the fluid outlet 50 because the portion of the central chamber 3 leading up to the gas outlet 51 presents a path of less resistance. Once the sample fluid reaches the gas outlet 51, a combination of surface tension and flow resistance present at the gas outlet 51 due to narrowing of the central chamber 3 prevents further fluid flow into the central chamber 3. At this point, the central chamber 3 is filled as depicted in FIG. 4B. With pressure and fluid still being applied to the sample inlet 1, the sample will now take the path of least resistance, which due to its larger cross-sectional area is the channel 2 leading to the fluid inlet 49 of either of the remaining empty central chambers 3. The filling process repeats with the remaining central chambers 3 as it did with the first central chamber 3, until all three central chambers 3 are filled as depicted in FIG. 4C. At the stage depicted in FIG. 4C, pressure is no longer applied to the sample inlet 1.

Once the sample fluid is partitioned into the central chambers 3, it can be distributed using centrifugation to downstream fluidics modules, regardless of their azimuthal position on the fluidic device 21 relative to the rotational center 19. The first stages of the centrifugal distribution are depicted in FIGS. 5A, 5B, and 5C. Initially, the central chambers 3 are filled as shown in FIG. 5A. The fluidic device 21 is then rotated, initiating from 0 Hertz until reaching a pre-determined rotational frequency ($\omega_{low}$). At or above this threshold frequency, the fluid in the central chamber 3 exerts enough pressure to flow through the first burst valve 5. The fluid is then motivated from the central chamber 3, through the fluid outlet 50 and the burst valve 5, and into the downstream channel 6, as depicted in FIG. 5B. Motivated by centrifugal force, the fluid continues to flow through the channel 6 and fills the metering chambers 7 as it progresses, as depicted in FIG. 5C.

FIGS. 6A, 6B, and 6C illustrate the final stages of fluid distribution to the reaction chambers 9. As shown in FIG. 6A, the metering chambers 7 are filled and the remaining sample fluid still flows through the channel 6 under centrifugal pressure. This stage is typically fleeting as the fluid generally flows rapidly through the channel 6. Excess fluid that cannot be accommodated by the metering chambers 7 continues to flow through the channel 6 until reaching the excess fluid chamber 13 where it collects. Meanwhile the metering chambers 7 remain filled, thereby precisely partitioning the fluid, as shown in FIG. 6B. At this point, the rotational frequency of the centrifugal fluidic device 21 is increased from $\omega_{low}$ to another, higher rotational frequency which is also pre-determined, $\omega_{high}$. At this higher rotational frequency, the fluid in the metering chambers 7 exerts enough pressure to move past the second set of burst valves 8 and into the reaction chambers 9, as shown in FIG. 6C. As the fluid moves into the reaction chambers 9, it displaces gas previously present in the reaction chambers 9 through a gas outlet 24 and into a gas conduit 14. This gas conduit 14 provides a common route for gas exiting all the reaction chambers 9 through their gas outlets 24 to move towards an ultimate gas outlet 15 which permits displaced gases to exit the centrifugal fluidic device 21. At this stage, with the reaction chambers 9 filled with partitioned sample, a multiplexed assay can commence once the appropriate reaction conditions are satisfied.

FIG. 7 is a layout view of an alternative embodiment of the invention as a centrifugal fluidic device 32. This embodiment possesses features which are homologous to those in the other centrifugal fluidic device 21, and should serve to illustrate one of the many ways in which embodiments of the invention can be realized. As in the other centrifugal fluidic device 21, this fluidic device 32 features an indentation 31 for mechanical engagement and a fluid inlet 33 for sample input. This centrifugal fluidic device 32 features a larger number of central chambers 37 and associated fluid inlets 46, fluid outlets 47, and gas outlets 48. There are channels 34 which route fluid from the sample inlet 33 to the fluid inlets 46 of the central chambers 37. There are also gas conduits 35 which permit gas displaced through the gas outlets 48 of the central chambers 37 to leave the centrifugal fluidic device 32. There are burst valves 36 between the fluid outlets 47 and secondary fluid channels 38, with the secondary fluid channels 38 functioning to route fluid to a larger number of metering chambers 39, valves 40, and reaction chambers 41. This increased number of reaction chambers 41 relative to the other centrifugal fluidic device 21 can provide for enhanced multiplexing capabilities which can entail assays that are broader, more specific, or feature technical replicates. As in the other centrifugal fluidic device 21 the secondary channels 38 in this centrifugal fluidic device 32 terminate in excess fluid chambers 44, and each reaction chamber 41 possesses a gas outlet 42 which feeds into a shared gas conduit 45 which connects to a gas outlet 43. This centrifugal fluidic device 32 can be centrifugally pumped in a similar manner to the other centrifugal fluidic device 21. Specifically, it can be rotated at a first, lower rotational frequency ($\omega_{low}$) to motivate fluid from the central chambers 37 radially outwards towards downstream fluidic structures. Once the fluid has been metered by the metering chambers 39, the centrifugal fluidic device 32 can then be rotated at a second, higher rotational frequency ($\omega_{high}$) to motivate fluid from the metering chambers 39 past the valves 40 and into the reaction chambers 41. At this point, depending on the necessary reactions conditions (i.e. temperature), a multiplexed assay can begin.

Embodiments of the invention can serve a large number of industrial applications. With suitable manufacturing techniques, a variety of reagents can be pre-loaded into the reaction chambers of the centrifugal fluidic devices, permitting a broad spectrum of multiplexed assays to be performed. These assays can include but are not limited to assessments of metal, chemical, and biological contaminants in water supplies, quantification of protein concentrations, and analysis of nucleic acids. With respect to analysis of nucleic acids, there are a number of specific applications. These can include genotyping assays, which are useful for selective breeding of livestock and crops, forensic tests in criminal investigations, screenings for genetic diseases, and verifications of familial relations. Additionally, analyses of nucleic acids are useful in food testing, where it can be used to test food products for biological contaminants (i.e. *Escherichia coli, Salmonella enterica*). Nucleic acid analysis is also useful for diagnosis of diseases in crops and livestock. Furthermore, embodiments of the invention which support nucleic acid analysis would be useful for medical diagnostics, permitting diagnosis of various pathogenic entities and permitting rapid public health responses to disease outbreaks. Such assays for the analysis of nucleic acids can be realized, for example, by the pre-loading of lyophilized polymerase chain reaction reagents into the reaction chambers of the centrifugal fluidic devices. Different sets of primers, responsible for detecting different sequences of nucleic acids, can be pre-loaded into the separate reactions chambers, thereby permitting multiplexing capabilities in a single centrifugal microfluidic device. This technology would therefore be useful to academic research, industry, medicine, and society as a whole While the present invention has been depicted as several embodiments and specified in reference to these embodiments, they should not be considered for purposes of limitation. There are numerous alterations, permutations, and equivalent embodiments which fall within the scope of this invention and would be evident to those of ordinary skill in the art. The following appended claims are intended to include all such alterations, permutations and equivalent embodiments which fall within the true spirit and scope of the present invention. In the claims that follow, reference signs are not to be construed as limiting the claims.

The invention claimed is:

1. A fluidic device (21) which is rotatable about a rotational center (19), comprising:

one or a plurality of first fluid inlets (1);

one or a plurality of first chambers (3) located farther from the rotational center (19) than any first fluid inlets (1), with each first chamber (3) having a fluid outlet (50), a gas outlet (51), and a fluid inlet (49); and one or a plurality of first channels (2), wherein each first channel (2) fluidly connects a first chamber's fluid inlet (49) to at least one of the one or a plurality of first fluid inlets (1), wherein each first chamber's fluid outlet (50) is located farther from the rotational center (19) than either the first chamber's fluid inlet (49) or the first chamber's gas outlet (51), wherein the first chamber's fluid outlet (50) has a higher resistance to fluid flow than the first chamber's gas outlet (51), wherein the first chamber's gas outlet (51) has a higher resistance to fluid flow than the first chamber's fluid inlet (49), and wherein, with input of fluid into the first fluid inlet or inlets (1), fluid is motivated through the first channel or channels (2) into each first chamber (3) via its fluid inlet (49), filling each first chamber (3) while not moving past the first chamber's fluid outlet (50) or gas outlet (51).

2. The fluidic device (21) as in claim 1, wherein for each first chamber (3) the cross-sectional area of the first chamber's fluid inlet (49) is greater than the cross-sectional area of the first chamber's gas outlet (51), which in turn is greater than the cross-sectional area of the first chamber's fluid outlet (50).

3. The fluidic device (21) as in claim 1, wherein the first chamber's fluid outlet (50) is closer to the first chamber's fluid inlet (49) than the first chamber's gas outlet (51) is to the first chamber's fluid inlet (49).

4. The fluidic device (21) as in claim 1, wherein the first chamber's fluid outlet (50) connects to a second channel (5), wherein the second Channel (5) is a fluidic valve which is fluidly connected to a third channel (6), wherein the third channel (6) follows a route which moves further from the rotational center (19) as it progresses azimuthally with respect to the rotational center (19), is lined on its radially distal side with respect to the rotational center (19) by a plurality of second chambers (7) to which it is fluidly connected, and terminates in a third chamber (13), wherein the second chambers (7) are terminated at their radially distal portions with respect to the rotational center (19) by a fourth channel (8), wherein the fourth channel (8) is a fluidic valve which connects each second chamber (7) to a separate fourth chamber (9), which is located further from the rotational center than the second chamber (7), and wherein each fourth chamber (9) has, a gas outlet (24) which is located on its radially proximal side with respect to the rotational center (19).

5. The fluidic device (21) as in claim 1, wherein at least one indentation (20) is present along the edge of the device.

6. An apparatus for partitioning fluid, comprising:

a fluidic device (21) as described in claim 1; and a means of rotating the fluidic device.

7. The apparatus as described in claim 6, wherein the means of rotating the fluidic device is a motor (26).

8. The apparatus as described in claim 7, wherein the motor (26) is attached to a rotor (25) and is controlled by a means for modulating rotational frequency.

9. The apparatus as described in claim 8, wherein the rotor (25) has at least one protuberance (30) which can mechanically engage with at least one indentation (20) present along the edge of the fluidic device (21).

10. A method for partitioning fluid, comprising:

introducing a fluid into a rotatable fluidic device (21) through one or more first fluid inlets (1);

applying pressure to motivate fluid from the first fluid inlet or inlets (1) into one or more first channels (2);

continuing to apply pressure to motivate fluid from a first channel (2) into a first chamber (3) via its fluid inlet (49), until fluid has reached both the first chamber's fluid outlet (50) and gas outlet (51), wherein each first chamber's fluid outlet (50) is located farther from the rotational center (19) than either the first chamber's fluid inlet (49) or the first chamber's gas outlet (51), wherein the first chamber's fluid outlet (50) has a higher resistance to fluid flow than the first chamber's gas outlet (51), wherein the first chamber's gas outlet (51) has a higher resistance to fluid flow than the first chamber's fluid inlet (49);

continuing to apply pressure such that fluid is motivated through the first fluid inlet or inlets (1) into another first channel (2) and into another first chamber (3) with which the another first channel is fluidly connected;

continuing to apply pressure until each first chamber (3) has liquid reaching its fluid outlet (50) and gas outlet (51); and rotating the fluidic device (21) at a first rotational frequency which can generate a sufficient centrifugal force such that the fluid in each first chamber (3) is motivated radially outwards through the first chamber's fluid outlet (50) and away from the first chamber's fluid inlet (49) and gas outlet (51).

11. The method for partitioning fluid as in claim 10, further comprising:

rotating the fluidic device (21) at the first rotational frequency to generate a sufficient centrifugal force such that the fluid in each first chamber (3) is motivated through the first chamber's fluid outlet (50), through a second channel (5) which functions as a fluidic valve, into a third channel (6), and into a plurality of second chambers (7) such that each second chamber (7) is filled up to a fourth channel (8) which terminates its radially distal portion with respect to the rotational center (19), with excess fluid beyond what can fill the second chambers (7) proceeding further along the second channel (6) until reaching a third chamber (13); and rotating the fluidic device (21) at a second rotational frequency which is higher than the first rotational frequency and generates a sufficient centrifugal force such that the fluid in each second chamber (7) is motivated through the fourth channel (8) which functions as a fluidic valve into a separate fourth chamber (9), with fluid displacing any gas present in the fourth chamber (9) via its gas outlet (24).

* * * * *